United States Patent [19]

Manoski et al.

[11] 4,283,424

[45] Aug. 11, 1981

[54] FROZEN PIZZA CRUST AND PIZZA SUITABLE FOR MICROWAVE COOKING

[75] Inventors: David P. Bone, Palatine; Paula M. Manoski, Schaumburg, both of Ill.

[73] Assignee: The Quaker Oats Company, Chicago, Ill.

[21] Appl. No.: 63,945

[22] Filed: Aug. 6, 1979

[51] Int. Cl.³ ............................................. A21D 13/00
[52] U.S. Cl. ...................................... 426/94; 426/103; 426/275; 426/307; 426/524
[58] Field of Search ................. 426/94, 524, 103, 274, 426/275, 502, 512

[56] References Cited

U.S. PATENT DOCUMENTS

| | | | |
|---|---|---|---|
| 3,769,035 | 10/1973 | Kleiner et al. | 426/244 |
| 4,020,188 | 4/1977 | Forkner | 426/502 |
| 4,170,659 | 10/1979 | Totino et al. | 426/502 |

*Primary Examiner*—Joseph M. Golian
*Assistant Examiner*—Elizabeth A. Hatcher
*Attorney, Agent, or Firm*—James T. FitzGibbon

[57] ABSTRACT

A frozen pizza product, particularly adapted for cooking and/or reheating in a microwave oven, and method of making such product. The pizza product of the invention includes a crust comprised of first and second crust elements with the first crust element being comprised of a baked cracker-type dough material having a moisture content of about 5% or less, with the second crust element being a baked bread dough type crust having a moisture content of about 20%–40%. The bread dough crust portion immediately overlies the cracker dough crust portion and, in use, the cracker crust is adapted to absorb excess moisture created during microwave cooking of the product. The method includes separately forming and, in some cases, baking the crust portions and then placing the two crust portions for overlying relation before adding a pizza sauce or other topping to the product.

5 Claims, 4 Drawing Figures

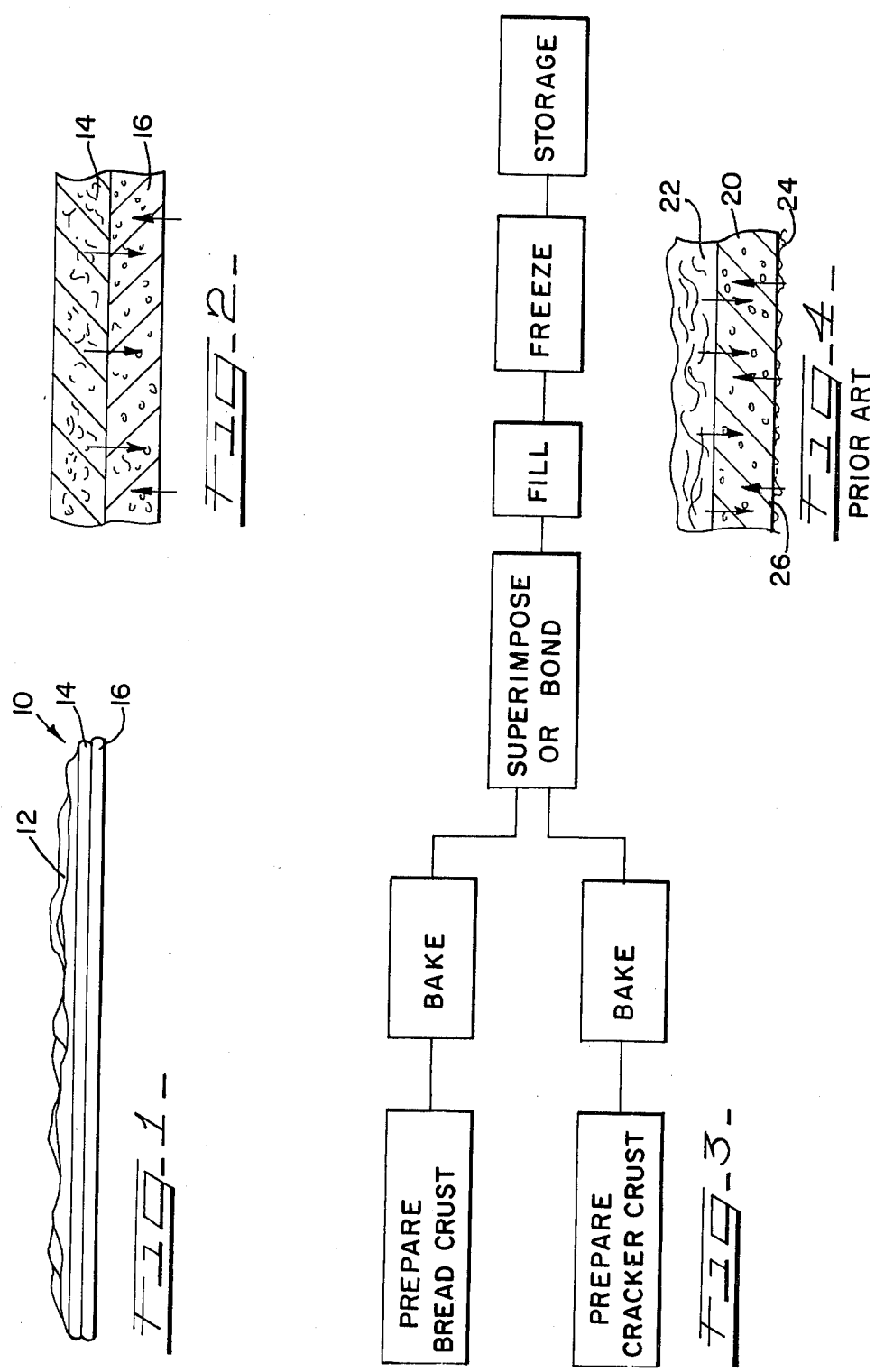

FROZEN PIZZA CRUST AND PIZZA SUITABLE FOR MICROWAVE COOKING

The present invention relates generally to specialty food products, and more particularly, to food products which are capable of economical mass production manufacture, which can subsequently be placed in frozen storage, and which can then be defrosted, heated and cooked in a microwave oven without loss of palatability.

A product with which the invention is concerned, and one which is extremely popular today because of its wide appeal to a variety of tastes and ease of preparation, are frozen pizzas. These and other prepared frozen food products were extremely popular before the general advent of microwave cooking, and since microwave ovens have come into more widespread use, the demand for convenience or specialty frozen foods has increased even further.

This is because, among other reasons, the time saving advantages of convenience foods are further helped by the speed of preparation which is made possible by microwave cooking. In view of these circumstances, it has been a logical development to attempt to cook frozen pizzas in microwave ovens, thereby combining the speed and ease of preparation associated with microwave cooking with the nutritional and taste variety advantages of pizza products. However, important difficulties have arisen with respect to pizzas attempted to be prepared directly from the frozen state in microwave ovens.

As is well known, the microwave oven operates on the general principle of a reaction between the microwave energy and the water contained in the product to be cooked, with the rapidly alternating polarity of the microwaves serving to cause an induced dipole reaction within the water. This, in turn, creates the heat which is used to cook the product. Because a microwave oven operates to act on and heat the portions of the product containing the water, but do not act on the air space surrounding the product, the heat is effectively applied only where moisture exists.

As a consequence, in preparing ordinary frozen pizzas in a microwave oven, microwave energy rapidly heats the filling portion of the pizza, which contains a major portion of water, and creates water vapor as the cooking process continues. Typically, pizza sauce might contain up to 80% water weight. The crust which typically contains about 30% water, is also heated, but at a different rate. Consequently, the water vapor created during cooking condenses on the frozen dough during the cooking process. It is believed that at least part of the problem of cooking frozen pizzas in a microwave oven results from the fact that, before the product is thawed, the crust portion heats faster than the sauce portion, while after thawing, the sauce heats more rapidly. During heating, certain of the water vapor escapes along the interface between the filling and the dough itself, ultimately condensing upon the colder surface of the crust.

As a result, most if not all pizzas attempted to be cooked in a microwave oven have been characterized by a satisfactorily heated and cooked filling, but an extremely unpalatable, often soggy crust.

Accordingly, there has been a need for a frozen pizza which would be able to be cooked in a microwave cooking apparatus without loss of palatability, and which would be equally susceptible to being cooked in a conventional oven. Such a frozen pizza or other specialty food product would also desirably be easy and economical to manufacture.

Accordingly, it is an object of the present invention to make an improved prepared frozen food product which retains palatability when cooked in a microwave oven or the like.

Another object of the invention is to provide a method and formulation for making a pizza or other prepared frozen food product which can be cooked in a microwave oven without loss of palatability.

Yet another object of the invention is to provide a frozen food product, such as a frozen pizza, which contains a filling, means for containing the filling, and means for absorbing extra water vapor which is generated from the filling within the crust component of the pizza, and which can absorb such moisture without loss of palatability.

A still further object of the invention is to provide a so-called microwavable pizza which contains a crust having two elements, one of which absorbs any excess water vapor which is generated during microwave cooking and which would otherwise impair the palatability of the dough or crust portion of the pizza product.

Another object is to provide an improved formulation and method for making a pizza having the above-described and other characteristics.

A still further object of the invention is to provide a pizza crust which is adaptable to be filled with a variety of ingredients and which, when cooked in a microwave oven, will not lose palatability, and in particular, will not become soggy or unduly moist during cooking.

A still further object is to provide a pizza having a pizza crust made up of two components, an upper or regular crust having a normal water content of up to about 30% by weight, and having a cracker type or extra dry bottom crust having a moisture content of about 5% or less by weight.

The foregoing and other objects and advantages of the invention are achieved in practice by providing a specialty frozen food product having a precooked and frozen crust comprised of a regular dough crust in the upper portion having about 20–40% water by weight, with such crust portion surmounting and being in immediate physical contact with a thin sheet of cracker type bottom crust having 5% or less moisture, with such crusts being attached to each other and with the upper crust containing a pizza or like filling. The invention also achieves its objects by providing a method of making a pizza or other specialty food product by forming a very dry, cracker type bottom crust, placing a regular dough type crust having 20–40% moisture content thereabove, keeping the two crusts in associated relation, filling the crust with sauce, and freezing the composite product for subsequent distribution and sale.

The manner in which these and other objects of the invention are achieved in practice will become more apparent when reference is made to the following description of the preferred embodiments of the invention set forth by way of example and shown in the accompanying drawings, wherein like reference numbers indicate corresponding parts throughout.

BRIEF DESCRIPTION OF THE DRAWINGS

FIG. 1 is a side elevational view of a pizza food product incorporating the principles of the invention, with the crust thereof shown slightly enlarged for purposes of clarity;

FIG. 2 is a vertical sectional view, on an enlarged scale, illustrating the moisture control action of the novel pizza crust made according to the principles of the invention;

FIG. 3 is a diagrammatic view showing typical steps in one method of making a novel pizza food product of the invention; and FIG. 4 is a vertical sectional view, on an enlarged scale, showing a prior art pizza food product and illustrating the problem overcome by the food product of the present invention.

DESCRIPTION OF THE PREFERRED EMBODIMENTS OF THE INVENTION

While the principles of the invention may be embodied in a number of food products, a detailed description thereof will be made with respect to a product wherein the frozen convenience food is a pizza.

Referring now to the drawings in greater detail, FIG. 1 shows that a pizza food product made according to the invention, and generally designated 10, includes a topping portion 12 which is made from conventional ingredients such as tomato sauce, cheese, and perhaps others such as sausage, mushrooms, peppers, onions, or the like. This topping surmounts an upper crust element 14, which in turn overlies a lower crust portion 16.

In FIG. 1, the thickness of the crust is exaggerated for purposes of illustrating certain features of the invention. According to the invention, the upper crust 14 is made from a conventional dough material which is partially or completely baked, and which in turn derives from ordinary bread dough having, in the finished state, a moisture content of about 20% to about 40% by weight, and in normal practice, about 33% moisture.

The lower crust 16 is referred to herein as a cracker crust, and is made from a cracker material, that is, from a specialty formulated dough which is mixed and then baked rapidly at a high temperature, with the finished product having less than 5%, and preferably about 3% moisture by weight. As is referred to elsewhere herein, when a pizza of the type shown in FIG. 1 is placed in a microwave oven, the ingredients heat rapidly, the crust heats at a somewhat lower rate, but the vapor phase, and in some cases, liquid phase water, which is created by the microwave cooking, and which passes into the air space surrounding the pizza, does not disadvantageously cause the crust to become soggy.

FIG. 2 is an enlarged fragmentary sectional view taken through a portion of the pizza product of FIG. 1, showing parts of the upper crust 14 and the lower crust 16, and schematically showing the passage of water vapor through the crust and also into the crust, with the illustration showing the possibility of water vapor entering the lower or cracker crust 16 from both directions. In this connection, it will be understood that the interface between the upper surface of the upper crust and the filling may also be exposed to liquid or water vapor generated during the heating of the topping 12 which surmounts the upper crust 14.

Referring now to FIG. 4, a prior art pizza crust 20 and topping 22 are illustrated. FIG. 4 shows that when the pizza 20, 22 was placed in an energized microwave oven, heat would generate liquid and vapor phase water. The vapor phase water would condense in droplets 24 on the lower surface 26 of the crust, and this water liquid phase water would penetrate into the crust, increasing the water content thereof beyond the desired percentage and causing the crust to become soggy and unpalatable.

FIG. 4 also shows that liquid or vapor phase water could penetrate into the crust from the top of the crust 20, or from the surface on which the filling 22 is placed. According to the invention, the drawbacks of the prior art are avoided as by manufacture of the pizza of the type illustrated if FIG. 1.

Referring now to FIG. 3, a diagrammatic view shows various steps in the preparation of the invention, some of which are described in greater detail herein. As shown, the cracker crust portion is prepared and partially baked, while a bread type crust is also prepared and partially or completely baked. These two crusts are then superimposed upon each other, or bonded together such as by the use of corn starch or syrup. After the crusts are assembled to form an upper and lower crust of the type illustrated in FIG. 1, the pizza is filled and then frozen for storage or subsequent distribution.

FIG. 1 illustrates a flat type pizza crust, but will be understood that the invention is also advantageously applied to a so-called deep dish pizza in which there may be a side wall or other margin surrounding the filling portion of the pizza.

Referring now to the manufacture of a formulation which is suitable for use with the invention, a dough for making the lower or cracker type crust 16 was prepared as follows.

A so-called "sponge" was made by mixing about 64.6 parts of protein flour, about 0.3 parts of an active yeast and about 35.1 parts of warm water at 85° to 90° F. This sponge material was mixed or kneaded for about 2-3 minutes and placed in a sealed plastic bag in a humidity cabinet, where it was stored for a period of about eighteen hours at 82° F., at a relative humidity of about 70-80%.

The remainder of the crust ingredient comprised a dough made from 1.5 parts of sodium bicarbonate, 77 parts of water, 40 parts of flour, 30 parts of shortening and 3 parts of salt. The dough ingredients were mixed and added to the sponge mixture with which they were mixed for a period of about five minutes or less. This combination of ingredients was then placed in a relatively air tight plastic bag and allowed to remain for about five hours at 85° F.

The resulting product was then rolled into a thin sheet, folded over upon itself five times and rolled out again, cut to shape and punctured. In a preferred form, the sheet was about ⅛" or less in thickness. The product thus prepared was baked in a very hot oven (500° F.) for three and one-half minutes, forming a thin flat cracker crust. In the finished and baked form, the moisture content of this crust was approximately 3%.

The upper or bread type crust was made from the following ingredients:

| Ingredient | Parts by Weight |
|---|---|
| Flour | 100 |
| Gluten | 1 |
| Salt | 1 |
| Dextrose | 1 |
| Yeast | 2 |
| Soy oil | 3 |
| Water | 50 |
| Ca propionate | ½ |
| Na meta-bisulfite | 90 ppm |

The ingredients referred to above are mixed in a conventional manner, that is, the dextrose, salt and oil are mixed, and the contents thereof added to cake style yeast dissolved in warm water. Thereupon the flour, gluten, the additional water and the chemical additives are blended in during mixing. The product is mixed at a slow speed for approximately two to three minutes and at a high speed for four to eight minutes, with the mixed product attaining a temperature of 95° F.

In the above formulation, the ingredients are conventional and are known to those skilled in the art. The calcium propionate retards spoilage and the sodium metabisulfite serves to lower the elastic memory of the dough, i.e., to reduce the elasticity or tendency thereof to return to its original shape so that it can be more easily pressed into and remain in flat sheet form.

The bread dough was then also proofed and sheeted, being formed into a flat sheet of about ¼" thickness. In one method of manufacture according to the invention, the upper or bread type crust, typically of the ¼" thickness just referred to, was placed directly on top of the lower or cracker crust, which had been prepared as described above and which had a thickness of about ⅛". Thereupon, the upper crust was topped with a typical pizza sauce material comprised of tomato sauce, cheese, and one or more typical additional pizza ingredients, such as sausage, onions, mushrooms, green peppers, etc. The pizza product thus made was then frozen in a known manner and packaged for storage.

Upon being removed from storage, after an elapse of a time equal to that which would normally elapse in moving the product to market, the pizza was unwrapped and placed directly into a microwave oven in the frozen state.

With suitable manipulation of the controls, the pizza product was cooked until the filling portion was steaming hot, and the crust was warm or hot to the taste. Because of the lower moisture content of the cracker type bottom crust element, the pizza did not have the soggy or damp taste and texture normally associated with frozen pizzas attempted to be cooked in a microwave oven.

While the mechanism of the invention is not understood with certainty, and while the invention is not intended to be limited to any particular theory of operation, it is believed that the water, whether vapor or liquid phase, which is created during cooking of the pizza product, and particularly the filling portion thereof, is absorbed by the lower moisture content, cracker crust element of the composite crust. During the cooking operation, the ability of this particularly dry crust to absorb water without itself becoming soggy or causing its associated upper crust to become soggy, is an important feature of the invention. At any rate, the product made as described above, was very palatable after cooking in a microwave oven.

In another embodiment, the two substantially identical crusts were made in a nestable form, and the upper surface of the lower crust was covered with a syrup or corn starch material, with the upper or head type crust being then superimposed over the lower crust with the syrup or corn starch serving as a binder to hold the crust elements together. The pizza product was filled with sauce in a known manner, and was able to provide a palatable pizza free from the wet or soggy crust characterized by prior art pizzas heated in microwave ovens.

It will thus be seen that the present invention provides a novel pizza or like frozen speciality food product and method of making it, with such products and methods having a number of advantages and characteristics, including those herein pointed out and others which are inherent in the invention. The invention having been described by way of example, it is anticipated that the variations may be made in the manufacture of such speciality frozen foods products by those practicing the invention without departing from the spirit of the invention and the scope of the appended claims.

We claim:

1. A frozen pizza product comprising, in combination, a crust portion and a filling portion received atop said crust portion, said filling portion comprising a pizza sauce material and said crust comprising first and second crust elements, said first crust element being comprised of a baked, cracker type dough material having a moisture content of about 5% or less, said second crust element being a baked bread dough type crust having a moisture content of from about 20% to 40% moisture, said second crust immediately overlying said first crust in intimate contact therewith and supporting said filling portion, said cracker crust being adapted to absorb vapor phase moisture created during microwave cooking of said second crust portion and said filling, said absorption of moisture by said cracker crust thereby preventing undesirable increase in the moisture content of said second crust and in turn preventing said pizza as a whole from developing an unpalatable taste due to excess moisture content in the crust.

2. A frozen pizza as defined in claim 1 wherein said moisture content of said cracker crust element is about 3% by weight.

3. A frozen pizza product as defined in claim 1 wherein the moisture content of said bread crust element is about 33% by weight.

4. A frozen pizza product as defined in claim 1 wherein said first and second crust elements are joined by an edible adhesive material comprising corn starch and corn syrup.

5. A method of manufacturing a pizza product, said method comprising preparing a cracker type dough material, forming said cracker type dough material into a thin sheet for use as a first crust and baking said cracker type dough to form a first cracker-type finished crust having a moisture content of about 5% or less, preparing a bread dough material, forming said bread dough material into a thin sheet, at least partially baking said bread dough to produce a second, bread type crust having a moisture content of from about 25% to 35% by weight, placing said bread type crust in intimate overlying relation to said cracker type crust, and adding a pizza sauce topping to said bread type crust to form a pizza product, and freezing said pizza product for subsequent distribution and cooking.

* * * * *